United States Patent
Vulih et al.

(10) Patent No.: US 7,088,015 B2
(45) Date of Patent: Aug. 8, 2006

(54) SMOOTH VOLTAGE REGULATION TRANSITION CIRCUIT HAVING FAST RECOVERY

(75) Inventors: Salomon Vulih, Hillsborough, NJ (US); Raymond Louis Giordano, Flemington, NJ (US)

(73) Assignee: Intersil Americas Inc., Milpitas, CA (US)

( * ) Notice: Subject to any disclaimer, the term of this patent is extended or adjusted under 35 U.S.C. 154(b) by 568 days.

(21) Appl. No.: 10/346,530

(22) Filed: Jan. 17, 2003

(65) Prior Publication Data

US 2004/0140719 A1    Jul. 22, 2004

(51) Int. Cl.
*H02J 1/00* (2006.01)

(52) U.S. Cl. .......................... 307/86; 307/75
(58) Field of Classification Search ............ 307/80, 307/85, 86, 75
See application file for complete search history.

(56) References Cited

U.S. PATENT DOCUMENTS

| | | | |
|---|---|---|---|
| 5,280,233 A * | 1/1994 | Poletto et al. ............... | 307/66 |
| 5,631,606 A | 5/1997 | Tran ............................ | 330/253 |
| 5,811,895 A * | 9/1998 | Suzuki et al. ................. | 307/66 |
| 5,914,681 A | 6/1999 | Rundel ........................ | 341/135 |
| 6,118,188 A * | 9/2000 | Youssef ....................... | 307/43 |
| 6,259,171 B1 * | 7/2001 | Cheng ......................... | 307/85 |
| 6,600,365 B1 * | 7/2003 | Frith ........................... | 330/51 |
| 6,958,596 B1 * | 10/2005 | Sferrazza et al. ............ | 323/303 |

* cited by examiner

*Primary Examiner*—Brian Sircus
*Assistant Examiner*—Andrew M. Deschere
(74) *Attorney, Agent, or Firm*—Allen, Dyer, Doppelt, Milbrath & Gilchrist, P.A.

(57) ABSTRACT

A power supply switching circuit arrangement is configured to provide a relatively smooth (low noise) power supply switch-over during the transition between active and quiescent modes. Complementary inputs of an operational amplifier are selective coupled to feedback paths to the amplifier and the power supply switching circuit arrangement, so as to bias a switching transistor during system active mode at a value that is just slightly below the turn-on voltage of the transistor. This means that turning on the switching transistor for the purpose of providing quiescent mode powering of the utility device requires only a small transition in control voltage from an active mode 'almost turned-on' level.

27 Claims, 5 Drawing Sheets

SMOOTH VOLTAGE REGULATION TRANSITION CIRCUIT HAVING FAST RECOVERY

FIELD OF THE INVENTION

The present invention relates in general to DC power supply circuits and components therefor, and is particularly directed to a circuit arrangement for controllably interfacing an electrically powered utility device with a main DC power supply during active mode of operation, and with auxiliary DC supply during quiescent mode of operation. In addition, the circuit arrangement of the invention is configured to provide a relatively smooth (low noise) power supply switch-over during the transition between active and quiescent modes.

BACKGROUND OF THE INVENTION

Electrical power for operating a wide variety of electronic circuit-based products, such as portable and hand-held devices including notebook computers, personal digital assistants, cell phones, and the like, is typically supplied by one or more direct current (DC) power sources, including rechargeable, single-cell batteries. As one would expect, the ongoing demand for increased functionality and longer run time of these battery-powered products has led to the development of power conservation mechanisms, that either sense or are informed that the electronic device is not being actively used, and then take action to reduce power consumption.

As a non-limiting example, the power control circuitry of a laptop computer will customarily transition the computer's power supply from 'active' mode to 'sleep' or 'quiescent' mode of operation when the user closes the display lid or fails to manipulate an input/output device within some prescribed period time. During this idle mode, the power control circuitry functions to keep only essential portions of the operational capability of the computer active, in order to reduce the power drain. Subsequently, in response to the user reinitiating use of the device, the power conservation circuit switches back to the main supply.

To date, circuits that have employed for this purpose customarily contain some form of power supply coupling (transistor) circuit that controllably switches between the main supply and a reduced quiescent mode auxiliary source. A primary drawback to these circuits is the substantial switching transients that are generated when the coupling circuit transitions between the two supply paths. This noise is often due to the fact that the switching operations employ substantial 'fully off' and 'fully on' biasing of the transistors through which the power supply voltages are routed.

SUMMARY OF THE INVENTION

In accordance with the present invention, these and other shortcomings of conventional power supply switching circuits are effectively obviated by a new and improved power supply switching circuit arrangement, that is configured to provide a relatively smooth (low noise) power supply switch-over during the transition between active and quiescent modes, by biasing a switching transistor during system active mode at a value that is just slightly below the turn-on voltage of the transistor. This means that turning on the switching transistor for the purpose of providing quiescent mode powering of the utility device requires only a small transition in control voltage from an active mode 'almost turned-on' level.

Pursuant to a preferred, non-limiting, embodiment, the power supply switching arrangement of the invention comprises includes a main power supply switch, such as a power field effect transistor (FET), coupled to a DC power source (such as a buck-mode, pulse width modulation (PWM) DC-DC converter), and an auxiliary power supply switch (such as a bipolar (e.g., NPN) transistor) coupled to a prescribed DC voltage supply rail. The current flow path through each switch is supplied to an output port, which is coupled to a utility device. The main power supply switch is closed during active mode, but is open during quiescent mode. The auxiliary power supply switch is off during active mode and on during quiescent mode. During active mode, the main power supply switch couples a regulated DC voltage (e.g., 3.3 VDC) to the utility device. During quiescent mode, the auxiliary switch couples 3.3 VDC to the utility device from a separate power supply rail.

For this purpose, the bipolar transistor used for the auxiliary power supply switch has its collector coupled to the auxiliary power supply rail, its emitter coupled to the output port and its base coupled to the output of an operational amplifier. Operational parameters of the amplifier are such that, for a balanced differential input voltage condition (i.e. like voltages are applied to its complementary polarity inputs), the amplifier causes the emitter of the bipolar transistor to provide a DC output voltage (e.g., 3.3 VDC) voltage corresponding to that output by the main DC power supply.

In active mode, the base voltage applied to the auxiliary power switch transistor is controlled so as to be at approximately the same voltage as its emitter voltage, so that the base-emitter voltage of this transistor is just below its Vbe turn-on voltage, thereby placing the transistor in an 'almost turned-on' state. When the circuit transitions from active mode to quiescent mode, the amplifier drives the base of the NPN transistor with a higher voltage, so that its base-emitter junction is biased above its Vbe turn-on voltage, whereby the auxiliary power switch transistor emitter supplies an output voltage whose value is on the order of the regulated voltage (3.3 VDC) of the main supply.

To this end, the power supply output port is coupled through a first voltage divider which is referenced to a prescribed voltage (e.g., ground (GND)). The parameters of the voltage divider are such as to feed back a prescribed fraction of the output voltage at the output port to a selected input of the operational amplifier. In addition, the output of the amplifier is coupled to a second voltage divider the resistance components of which match those of the first voltage divider. As will be described, the effective matching of the two voltage dividers ensures that, during active mode, the voltage at the output of the amplifier effectively tracks the emitter voltage Ve of the auxiliary power switch transistor, and thereby keeps this transistor biased just below its Vbe turn on voltage. Also, during quiescent mode, it ensures that the voltage at the output of the amplifier is sufficient to turn on the auxiliary supply transistor and cause its emitter voltage to have a value on the order of the desired DC voltage of the output node (e.g., 3.3., VDC).

During active mode, the utility device is powered through the closure of the main power supply switch. During this mode, the base drive to the auxiliary supply transistor is preset at a value that is proximate to the emitter voltage, so as to effect a preset the base electrode of the auxiliary power switch transistor at a voltage value that will allow a relatively smooth switch-over to quiescent mode powering. For this purpose, complementary polarity inputs to the amplifier are coupled to receive respective divided values of the equal voltages applied to first and second voltage dividers. This causes the base of the auxiliary transistor to see a voltage on the order of 3.3 VDC, so that it is 'just about ready' to turn on. What it needs is only a slight increase in base drive.

When the system transitions from active mode to quiescent mode, a control signal is applied to the gate of the main power supply switch, turning it off, so that the regulated 3.3 VDC supplied by the main DC supply is no longer coupled to the utility device. Instead, in quiescent mode, the base drive to the auxiliary supply transistor is supplied with a value that at least equals its turn on voltage. To this end, through selective closure of a set of switches coupled to the input of the amplifier, a non-inverting input of the amplifier is coupled to receive a reference voltage, which corresponds to a prescribed fraction of the regulated 3.3 VDC voltage. In addition, an inverting input of the amplifier is coupled through a voltage divider to the output port.

Since the output port is coupled to the emitter of the auxiliary supply transistor, the inverting input of the amplifier will be applied with whatever voltage is at the emitter of the auxiliary supply transistor. The amplifier will proceed to drive its output to bring the voltage at the inverting input into balance with that applied to its non-inverting input, which is coupled to receive a prescribed fraction of the regulated voltage. Thus, the amplifier will drive the base of the auxiliary supply transistor such that its emitter is at a voltage equal to the intended regulated voltage. Namely, throughout quiescent mode, the base of the auxiliary supply transistor is driven by the amplifier with a voltage that maintains complementary amplifier inputs in balance, so that the voltage at the emitter of the auxiliary supply transistor and thereby output node remains at the intended regulated voltage.

DETAILED DESCRIPTION

Figure 1:
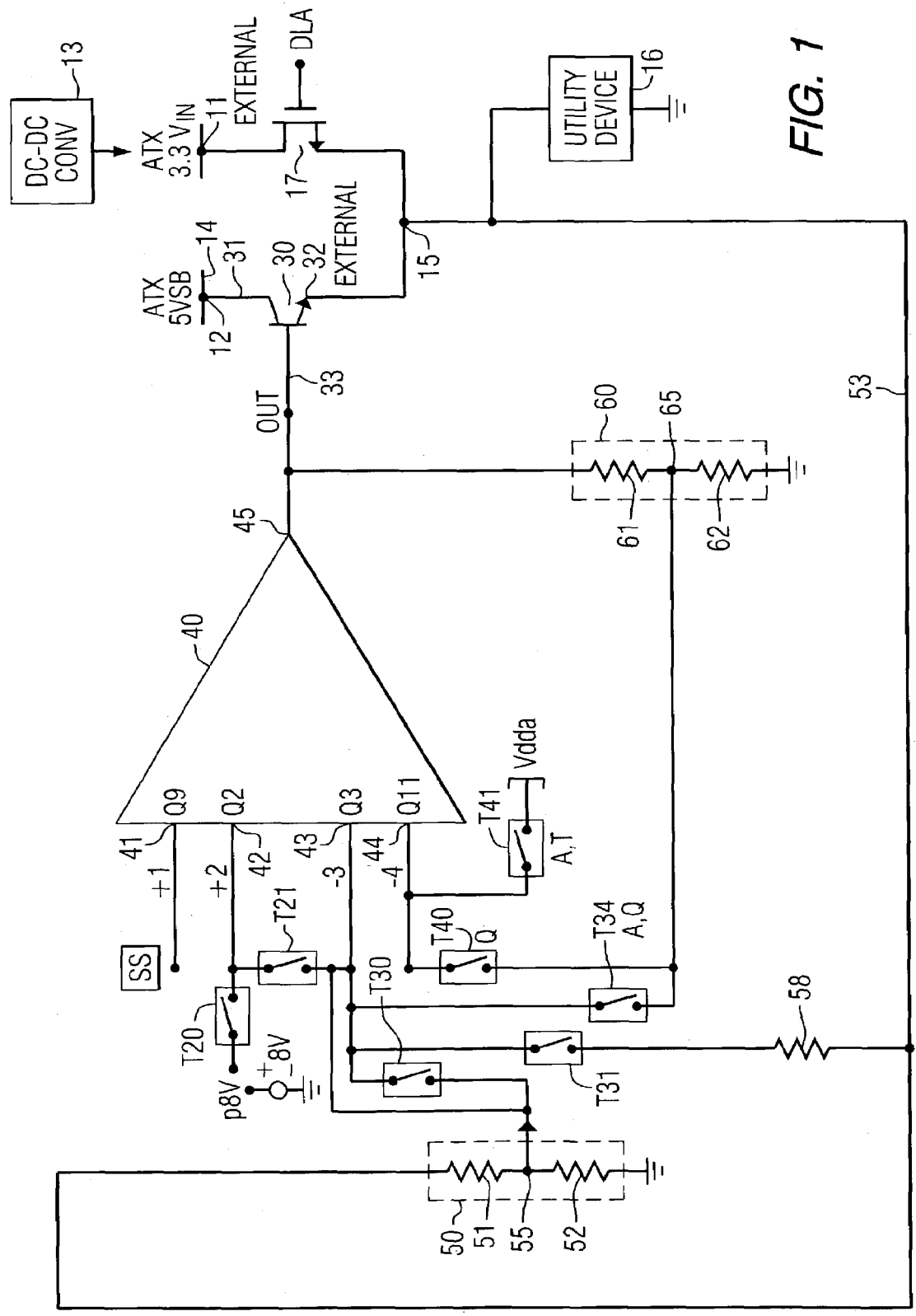
FIG. 1 is a reduced complexity diagrammatic illustration of the power supply switching arrangement of the invention.
Figure 2:
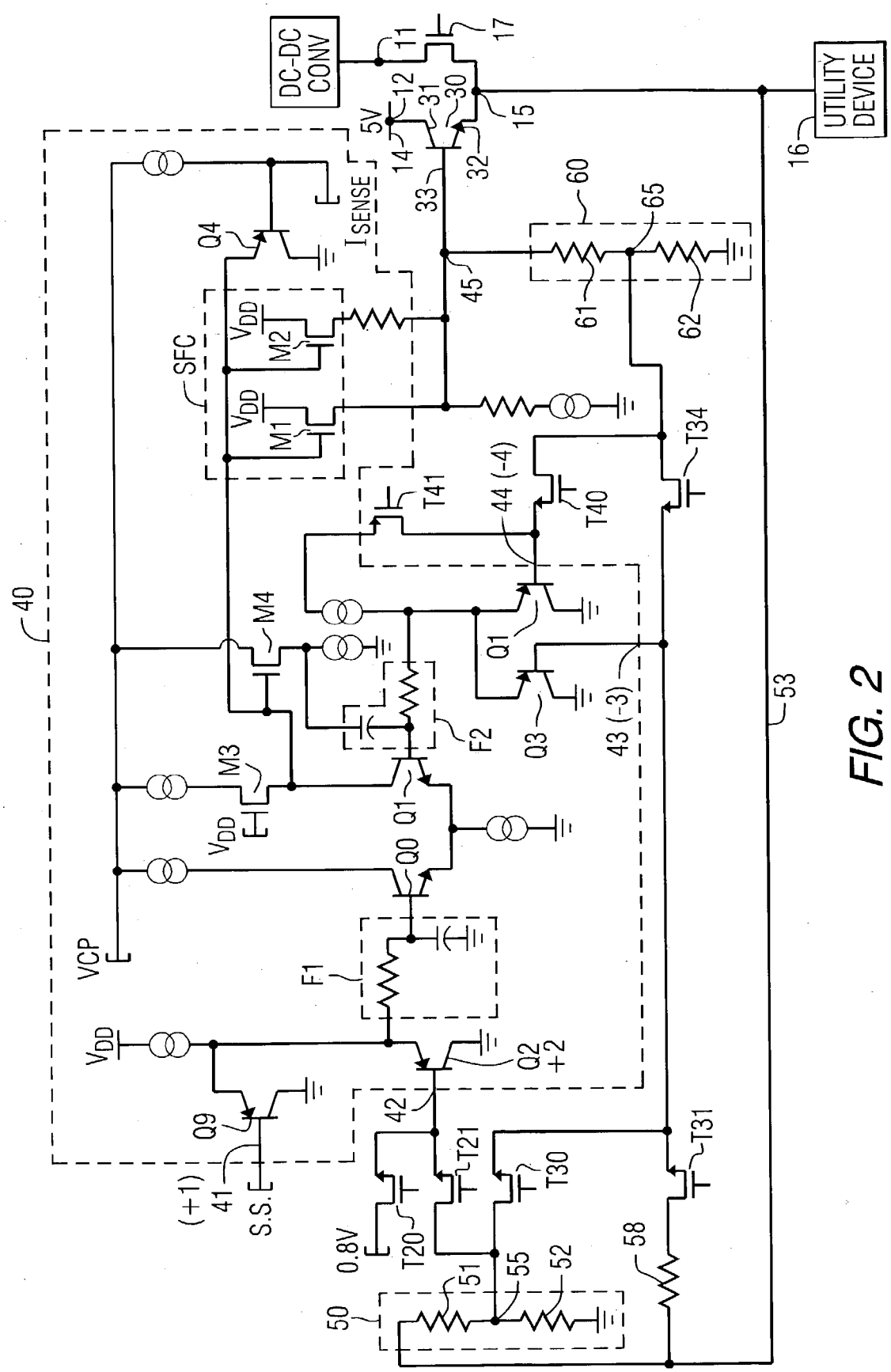
FIG. 2 is a detailed schematic of the power supply arrangement shown in FIG. 1.

Attention is initially directed to FIGS. 1 and 2, wherein the power supply switching arrangement of the invention is depicted in respective generalized and schematic diagrams. It should be noted that throughout these diagrams various active elements are shown including bipolar and field effect devices. It is too understood however, that the invention is not limited thereto, but may be implemented using alternative equivalent circuit components. For example, bipolar devices may be appropriately replaced by field effect devices, and vice versa, and field effect devices used for switching elements may be replaced by alternative equivalent switching components.

As shown in the Figures, the power supply switching arrangement includes a first, main power supply input port 11, which is coupled to receive a DC input voltage from a direct current (DC) power source 13, such as a buck-mode, pulse width modulation (PWM) DC-DC converter of the type commonly employed in integrated circuit applications. In the illustrated example, the DC-DC converter is shown as supplying a regulated 3.3 VDC output. A second, auxiliary power supply input port 12 is coupled to a prescribed DC voltage supply rail 14, such as a +5 VDC supply rail. An output port 15, from which a prescribed output voltage (e.g., 3.3 VDC) is to be derived, is adapted to be coupled to a utility device 16 that is powered by the circuit of FIG. 1.

In order to controllably supply the utility device with power from the main power source 13, a main power switch 17 is coupled between the main DC supply input port 11 and the DC output port 15. In the illustrated embodiment, switch 17 is shown as a power FET having its source-drain path coupled between input port 11 and output port 15. As will be described switch 17 is closed during active mode, but is otherwise open ('off' during quiescent and test modes). The gate of FET 17 is coupled to receive a control signal that changes states between a powered system 'active' (A) mode and a powered system 'quiescent' (Q) mode. As will be described, during active mode, the main power supply switch is closed (FET 17 is turned on), so that the voltage (e.g., regulated 3.3 VDC) supplied by the main DC supply 13 will be coupled directly through switch 17 to the utility device 16. During quiescent mode, on the other hand, the main power supply switch is open (FET 17 is off), and DC power is provided by way of the auxiliary supply 14.

For this purpose, a controlled electronic device, shown as an NPN bipolar transistor 30, which may be externally connected, is coupled between the auxiliary power supply rail 14 and output port 15. Transistor 30 has its collector 31 coupled to the auxiliary power supply input port 14, its emitter 32 coupled to the output port 15 and its base 33 coupled to the output 45 of an operational amplifier 40. The operational amplifier 40 is of a conventional configuration, and its design parameters are such that for a balanced differential input voltage condition (i.e. like voltages are applied to its complementary polarity inputs), amplifier 40 is designed to drive the base 33 of bipolar transistor 30, such that its emitter 32 provides a prescribed DC output voltage at output port 15 which, in the present example, corresponds to the 3.3 VDC voltage from the DC power supply 13.

To this end, as shown in FIG. 2, amplifier 40 comprises a differentially connected bipolar transistor pair Q0 and Q1, with respective input RC filters F1 and F2 and opposite polarity input transistor pairs Q9, Q2 and Q3, Q11, as well as a source follower circuit SFC containing FETs M1 and M2 coupled to the amplifier output 45. Also, a voltage clamping FET M3 is coupled between the collector of transistor Q1 and an associated power supply rail, while an AC compensation return path FET M4 is coupled between RC filter F2 and the supply rail.

As will be described, during system active mode, the base voltage applied to NPN transistor 30 is controlled so as to be at approximately the same voltage as its emitter voltage, so that the base-emitter voltage of the NPN transistor is just below its Vbe turn-on voltage, placing the NPN transistor in an 'almost turned-on' state. During quiescent mode, amplifier 40 drives the base of NPN transistor 30 with a higher voltage, so that its base-emitter junction is biased above its Vbe turn-on voltage, whereby the emitter of transistor 30 supplies an output voltage on the order of the regulated voltage supplied by the main supply.

The power supply output node 15 is further coupled over a feedback line 53 to a first voltage divider 50 comprised of resistor 51 and resistor 52, which is referenced to a prescribed voltage (e.g., ground (GND)). The values $R_{51}$ and $R_{52}$ of resistors 51 and 52, respectively, are chosen so as to feed back a prescribed fraction of the output voltage at output port 15 to a selected input of the operational amplifier 40. For this purpose, a common node 55 between resistors 51 and 52 is coupled to a pair of FET switches T21 and T30, the source-drain paths of which are coupled to respective second and third, opposite polarity inputs 42 and 43 of the operational amplifier 40. As will be described, switch T21 is closed during the active mode of the powered device, but is otherwise open (during quiescent mode and also during a test mode), while switch T30 is closed during quiescent mode, but is otherwise open (during active mode and test mode).

The second, non-inverting (+) input 42 of amplifier 40 is coupled to the base of amplifier input PNP transistor Q2, while the third, inverting (−) input 43 is coupled to the base of amplifier input PNP transistor Q3. The second, non-inverting input 42 of amplifier 40 is further coupled via the source-drain path of an FET switch T20 to a prescribed voltage, which is a predetermined fraction of the output voltage being fed back from the output port 15. Switch T20 is closed during quiescent and test modes, but is open during active mode.

A first, non-inverting (+) input 41 of amplifier 40, to which the base of transistor Q9 is coupled, receives a soft-start (ss) signal. The third, inverting (−) input 43 of amplifier 40 is further coupled via a switch T31 and resistor 58 to feedback line 53, and via a switch T34 to a node 65 of a voltage divider 60. Switch T31 is closed during test mode, but is otherwise open (during active and quiescent modes). Switch T34 is closed during active mode, but is otherwise open (during quiescent and test modes).

Voltage divider 60 is comprised of resistors 61 and 62 coupled in series between the output 45 of amplifier 40 and GND. The resistance values $R_{61}$, and $R_{62}$ of resistors 61 and 62, respectively, are chosen to effectively match the values of resistors 51 and 52 of the first voltage divider 50. As will be described, the effective matching of these parameters of the two voltage dividers serves to ensure that during active mode, voltage $V_{45}$ at the output 45 of the operational amplifier 40 effectively tracks the emitter voltage Ve of transistor 30, and thereby keeps transistor 30 biased just below its Vbe turn on voltage. Also, during quiescent mode, this ensures that the voltage at the output 45 of the amplifier 40 is sufficient to turn on the auxiliary supply transistor 30 and cause its emitter voltage to have a value on the order of the desired DC voltage of the output node 15 (e.g., 3.3., VDC).

Operational amplifier 40 has a fourth, inverting (−) input 43 coupled via a switch T40 to a feedback path 56 from node 65 of the second voltage divider 60. Switch T40 is closed during quiescent mode, but is otherwise open (during active and test modes). Input 43 is additionally coupled via a switch T41 to a reference voltage Vdd. Switch T41 is closed during active and test modes, but is otherwise open (during quiescent mode).

Operation

The power supply switching arrangement of the invention has two principal modes of operation (ACTIVE and QUIESCENT), and a third, TEST mode of operation. Each of these modes will be described below with reference to respective FIGS. 3, 4 and 5, which are substantial copies of the diagram of FIG. 1, but with open FET switches omitted and closed FET switches shown as such.

Figure 3:
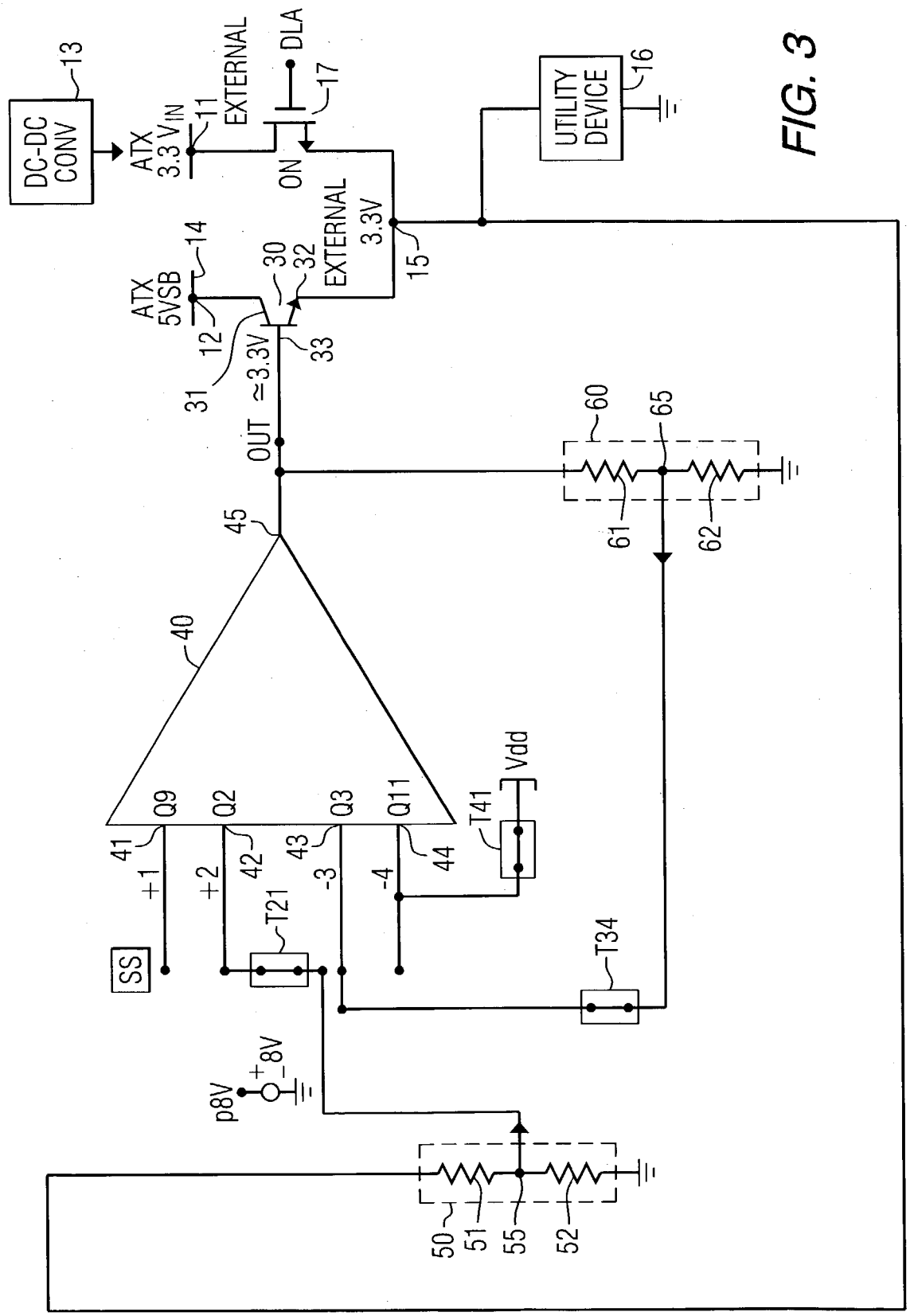
FIG. 3 is a replication of FIG. 1 for the ACTIVE mode of operation, omitting open FET switches and including closed FET switches.

Active Mode (FIG. 3)

During active mode, the utility device 16 is powered by the main power source, so that the main power supply switch is closed (FET 17 is turned on), whereby the voltage (e.g., regulated 3.3 VDC) supplied by the main DC supply 13 will be coupled directly through FET 17 to the utility device 16. In accordance with the invention, during this principal powering or ACTIVE mode, the base drive to the auxiliary supply transistor 30 is preset at a value that is proximate to or effectively tracks the emitter voltage, so as to facilitate a relatively smooth switch-over to the auxiliary supply during quiescent mode.

For this purpose, each of switches T21 and T34 is closed, and with switch T41 closed to a non-floating rail voltage (Vdd that effectively takes transistor Q11 out of the circuit). The remaining switches are open, and are therefore not shown in FIG. 3 as described above. In this state of the circuit, each of the two opposite polarity inputs 42 and 43 of the operational amplifier 40 will be coupled to receive respective divided values of the voltages applied to voltage dividers 50 and 60. As pointed out above, for like complementary polarity inputs, amplifier 40 is designed to provide a 3.3 VDC nominal output at output terminal 45.

In accordance with the parameters of the present example, the common feedback node 55 of voltage divider 50 provides a prescribed fraction of ($4/16.57$) of the 3.3 VDC output voltage at output port 15, or 0.8 VDC. In like manner, the common feedback node 65 of voltage divider 60 provides a like fraction of ($4/16.57$) of the 3.3 VDC voltage at the output 45 of amplifier, or 0.8 VDC. Thus the complementary polarity inputs 42 and 43 of the amplifier are balanced. This means that the base drive to the auxiliary transistor 30 is being fed 3.3 VDC, so that it is 'just about ready' to turn on. What it needs is only a slight increase in base drive.

Figure 4:
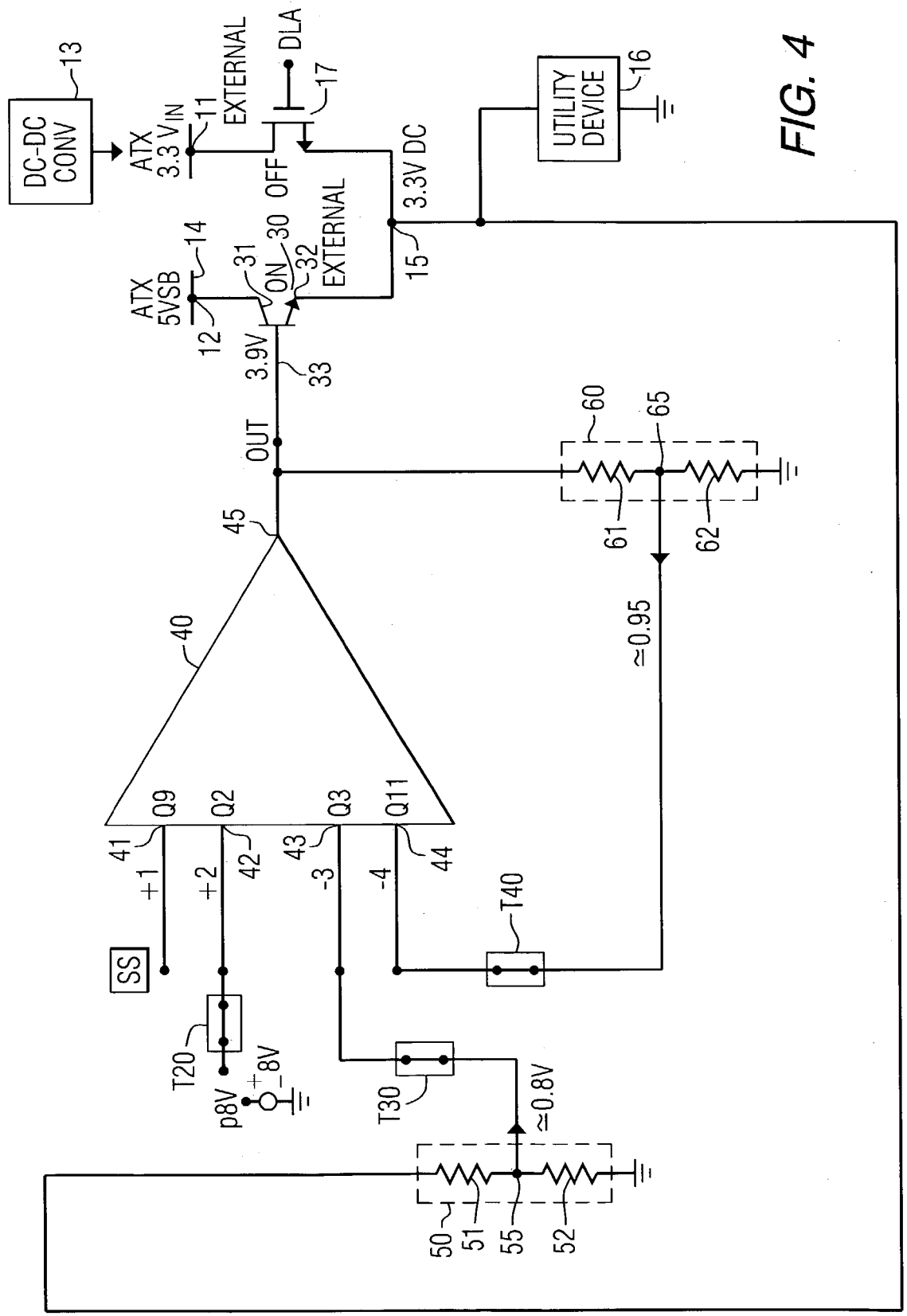
FIG. 4 is a replication of FIG. 1 for the QUIESCENT mode of operation, omitting open FET switches and including closed FET switches.

Quiescent Mode (FIG. 4)

When the system transitions from active mode to quiescent mode, a control signal is applied to the gate of the main power supply switch (to turn FET 17 off), so that the voltage (e.g., regulated 3.3 VDC) supplied by the main DC supply 13 is no longer be coupled through FET 17 to the utility device 16. Instead, in quiescent mode, the base drive to the auxiliary supply transistor 30 is supplied with a value that at least equals the turn on of NPN transistor 30. As pointed out above, during active mode, the base drive to transistor 30 is at a voltage that is very close to but not quite at the required turn on voltage. This accomplished by the switch closures for quiescent mode shown in FIG. 4.

More particularly, in quiescent mode switches T20, T30 and T40 are closed and the other switches are open. With switch T20 closed, the second, non-inverting (+) input 42 is coupled to receive a reference voltage of 0.8 VDC. As described above, this voltage value corresponds to a prescribed fraction ($4/16.57$) of the regulated 3.3 VDC voltage. Thus, in the course transitioning from active to quiescent mode, opening the switch T21 and closing the switch T20 effectively maintains the second, inverting (−) input 42 of the operational amplifier 40 at 0.8 VDC.

In addition, with switch T30 closed, the third, inverting (−) input 43 of amplifier 40 is coupled to the common node 55 of the voltage divider 50. Switch T40 is also closed, so as to couple the fourth, inverting (−) input 44 of amplifier 40 to the common node 65 of the voltage divider 60. However, as will be described, since the output 45 of amplifier 40 will be driven to a voltage greater than 3.3 VDC, the voltage at the fourth amplifier input 44 will be higher than that at the third amplifier input and is of no effect.

Since the voltage divider 50 is coupled to the output port 15, the inverting (−) input 43 of amplifier 40 will be coupled to whatever voltage is at the emitter 32 of transistor 30, and amplifier 30 will drive its output 45 to bring the voltage at the inverting (−) input 43 into balance with that applied to its non-inverting (+) input 42, which is coupled to 0.8 VDC. (It may be noted that at the transition from active to quiescent mode the voltage at the output node 15 will be on the order of the regulated power supply voltage of 3.3 VDC due to capacitive loading, so that the voltage seen by the inverting (−) input 43 of amplifier 40 should be close to 0.8 VDC.) Thus, amplifier 40 will drive the base 33 of transistor 30, such that its emitter 32 is at a voltage equal to the intended regulated voltage of 3.3 VDC (which is divided down by the voltage divider to the balancing voltage of 0.8 VDC). As a non-limiting example, the base drive for transistor 30 may be on the order of from 3.7–3.9 VDC. Thus, throughout quiescent mode, the base 33 of transistor 30 is driven by amplifier 40 with a voltage that maintains amplifier inputs 42 and 43 in balance, so that the voltage at the emitter 32 of transistor 30 and thereby output node 15 remains at the regulated voltage of 3.3 VDC.

From the foregoing, it will be readily appreciated that, during active mode, with amplifier 40 providing a base bias to transistor 30 that is just slightly below the turn-on voltage of the transistor, quiescent mode powering becomes relatively smooth, as the above-described equally ratioed voltage divider feedback scheme is able to maintain the desired differential control of the inputs to amplifier 40 to provide the necessary base drive to the transistor 30.

Figure 5:
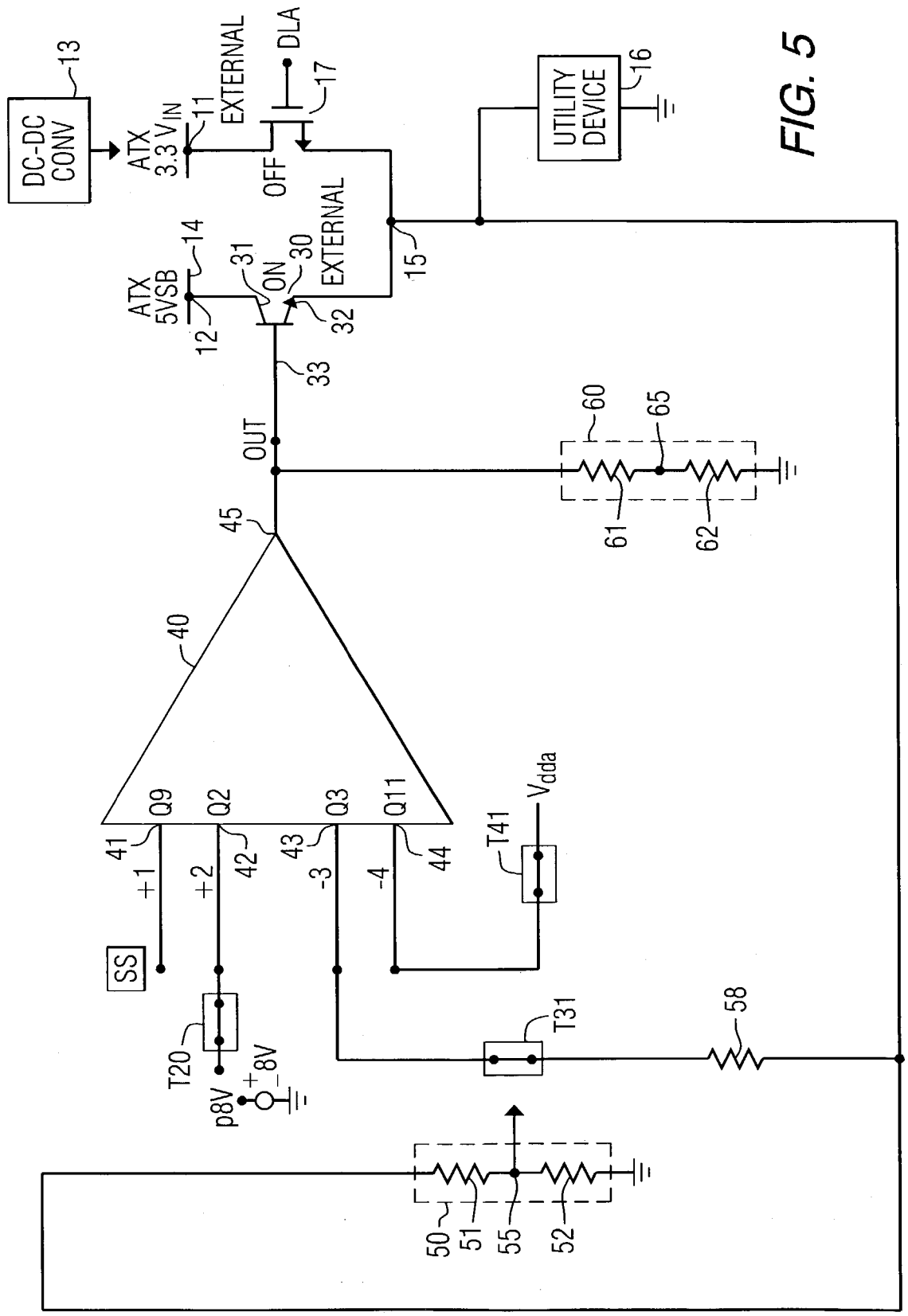
FIG. 5 is a replication of FIG. 1 for the TEST mode of operation, omitting open FET switches and including closed FET switches.

Test Mode (FIG. 5)

In the test mode of operation the two voltage dividers are by-passed. With switch T20 closed, the second input 42 of amplifier 40 is coupled to receive the 0.8 reference voltage, and with switch T31 closed, the third input 43 of amplifier 40 is coupled to the output port 15 at the emitter 32 of NPN transistor 30. In addition, switch T41 is closed to coupled the voltage Vdd to the fourth input 44 of the amplifier 40. This operation of the amplifier may now be directly monitored via its output port 45.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. A circuit arrangement for controllably interfacing an electrically powered utility device with power derived from a first voltage supplied by a main power source, for an active mode of operation of said utility device and irrespective of a second voltage supplied by an auxiliary power source, and, for a quiescent mode of operation of said utility device and irrespective of said first voltage supplied by said main power source, for interfacing said electrically powered utility device with power derived from said second voltage supplied by said auxiliary power source, said circuit arrangement comprising:

a controlled circuit path having a first input port coupled to receive said first voltage from said main power source, a second input port coupled to receive said second voltage from auxiliary power source, an output port to which said utility device is coupled, and a control port;

an operational amplifier having an input, and an output coupled to said control port of said controlled circuit paths; and a circuit path controller, coupled to said input of said operational amplifier, and being operative, for said active mode of operation of said utility device, to cause said controlled circuit path to apply power to said output port and thereby to said utility device, in accordance with said first voltage coupled from said main power source to said first input port, and to apply to said control port of said controlled circuit path a voltage that is proximate to, but having a value less than, a voltage that will cause said controlled circuit path to apply power to said output port, and thereby to said utility device, in accordance with said second voltage coupled from auxiliary power source to said second input port, and for said quiescent mode of operation of said utility device, to decouple said first input port from said output port, and to drive said control port of said controlled circuit path with a voltage that causes said controlled circuit path to apply power to said output port, and thereby to said utility device, in accordance with said second voltage from said auxiliary power source.

2. The circuit arrangement according to claim 1, wherein said controlled circuit path includes a controlled circuit device having an input coupled to said second input port, an output coupled to said output port, and a control input coupled to said control port.

3. The circuit arrangement according to claim 2, wherein said controlled circuit device comprises a transistor.

4. The circuit arrangement according to claim 2, wherein said controlled circuit device comprises a bipolar transistor having a collector coupled to said second input port, an emitter coupled to said output port, and a base coupled to said control port, and wherein said operational amplifier is operative to bias said bipolar transistor slightly off during said active mode and turn on said bipolar transistor during said quiescent mode.

5. The circuit arrangement according to claim 1, wherein said controlled circuit path includes a first transistor having an input electrode coupled to said first input port, an output electrode coupled to said output port, and a control electrode coupled to receive a switching signal that turns on said first transistor during said active mode and turns off said first transistor during said quiescent mode, and a second transistor having an input electrode coupled to said second input port, an output electrode coupled to said output port, and a control electrode coupled to the output of said operational amplifier, said operational amplifier being operative to bias said second transistor off during said active mode and turn on said second transistor during said quiescent mode.

6. The circuit arrangement according to claim 1, wherein said circuit path controller includes a first voltage feedback path that is controllably coupled from said output port to one of opposite polarity inputs of said operational amplifier.

7. The circuit arrangement according to claim 6, further including a second voltage feedback path coupled between said output of said operational amplifier and a negative polarity input of said operational amplifier.

8. The circuit arrangement according to claim 6, wherein said circuit path controller is operative to couple said first voltage feedback path to a first polarity input of said operational amplifier for said active mode, and to couple said first voltage feedback path to a second polarity input of said operational amplifier for said quiescent mode.

9. The circuit arrangement according to claim 8, wherein said circuit path controller is operative to couple said first voltage feedback path to a positive polarity input of said operational amplifier for said active mode, and to couple said first voltage feedback path to a negative polarity input of said operational amplifier for said quiescent mode.

10. The circuit arrangement according to claim 9, wherein, for said quiescent mode, said circuit path controller is operative to couple said positive polarity input of said operational amplifier to a prescribed voltage, and to couple said negative polarity input of said operational amplifier to the said second voltage feedback path.

11. The circuit arrangement according to claim 10, wherein said controlled circuit path comprises a bipolar transistor having a collector coupled to said second input port, an emitter coupled to said output port, and a base coupled to said control port, and wherein said operational amplifier is operative to bias said bipolar transistor slightly off during said active mode and turn on said bipolar transistor during said quiescent mode.

12. For use with an electrically powered utility device which, in an active mode, is coupled to receive power derived from said first voltage supplied by a main power source and irrespective of a second voltage supplied by an auxiliary power source, and, in a quiescent mode, is coupled to receive power derived from a second voltage supplied by said auxiliary power source and irrespective of said first voltage supplied by said main power source, a circuit arrangement for controllably interfacing said utility device with said auxiliary power source, said circuit arrangement comprising:
 a controlled circuit device having an input port coupled to said auxiliary power source, an output port to which said utility device is coupled, and a control port;
 an operational amplifier having an input, and an output coupled to said control port of said controlled circuit device; and
 a circuit device control path, coupled to at least said output port of said controlled circuit device and to said input of said operational amplifier, and being operative, for said active mode, to apply, to said control port of said controlled circuit device, a voltage that is proximate to a voltage necessary, but having a value insufficient, to cause said controlled circuit device to couple power derived from said second voltage supplied by said auxiliary power source to said utility device and, for said quiescent mode, to drive said control port of said controlled circuit device with a voltage that causes said controlled circuit device to couple power derived from said second voltage supplied by said auxiliary power source to said utility device.

13. The circuit arrangement according to claim 12, wherein said controlled circuit device comprises a transistor having an input coupled to said input port, an output coupled to said output port, and a control input coupled to said control port.

14. The circuit arrangement according to claim 13, wherein said controlled circuit device comprises a bipolar transistor having a collector coupled to said input port, an emitter coupled to said output port, and a base coupled to said control port, and wherein said operational amplifier is operative to bias said bipolar transistor slightly off during said active mode and turn on said bipolar transistor during said quiescent mode.

15. The circuit arrangement according to claim 13, wherein said circuit device control path includes a first voltage feedback path controllably coupled from said output port to one of opposite polarity inputs of said operational amplifier, and a second voltage feedback path coupled between said output of said opentional amplifier and a negative polarity input of said operational amplifier.

16. The circuit arrangement according to claim 15, wherein said circuit device control path is operative to couple said first voltage feedback path to a first polarity input of said operational amplifier for said active mode, and to couple said first voltage feedback path to a second polarity input of said operational amplifier for said quiescent mode.

17. The circuit arrangement according to claim 16, wherein said circuit device control path is operative to couple said first voltage feedback path to a positive polarity input of said operational amplifier for said active mode, and to couple said first voltage feedback path to a negative polarity input of said operational amplifier for said quiescent mode.

18. The circuit arrangement according to claim 17, wherein, for said quiescent mode, said circuit device control path is operative to couple said positive polarity input of said operational amplifier to a prescribed voltage, and to couple said negative polarity input of said operational amplifier to the said second voltage feedback path.

19. A method for controllably interfacing an electrically powered utility device with power derived from a first voltage supplied by a main power source, for an active mode of operation of said utility device and irrespective of a second voltage supplied by an auxiliary power source, and, for a quiescent mode of operation of said utility device and irrespective of said first voltage supplied by said main power source, for interfacing said electrically powered utility device with power derived from said second voltage supplied by said auxiliary power source, said method comprising the steps of:
 (a) coupling a first input port of a controlled circuit path to said first voltage supplied said main power source, a second input port to said second voltage supplied by said auxiliary power source, and an output port to said utility device, and a control port to an output of an operational amplifier;
 (b) for said active mode of said utility device, causing said controlled circuit path to apply power to said output port and thereby to said utility device, in accordance with said first voltage coupled from said main power source to said first input port, and to apply to said control port of said controlled circuit path a voltage that is proximate to a voltage necessary, but having a value insufficient, to cause said controlled circuit path to apply power to said output port, and thereby to said utility device, in accordance with said second voltage coupled from said auxiliary power source to said second input port; and
 (c) for said quiescent mode of said utility device, decoupling said first input port from said output port, and driving said control port of said controlled circuit path with a voltage that causes said controlled circuit path to apply power to said output port and thereby to said utility device, in accordance with said second voltage coupled from said auxiliary power source to said second input port.

20. The method according to claim 19, wherein said controlled circuit path includes a controlled circuit device having an input coupled to said second input port, an output coupled to said output port, and a control input coupled to said control port.

21. The method according to claim 20, wherein said controlled circuit path comprises a transistor having an input coupled to said second input port, an output coupled to said output port, and a control input coupled to said control port, and wherein said operational amplifier is operative to bias said transistor slightly off during said active mode and turn on said transistor during said quiescent mode.

22. The method according to claim 21, wherein step (b) comprises coupling a first voltage feedback path to a first polarity input of said operational amplifier, and step (c) comprises coupling said first voltage feedback path to a second polarity input of said operational amplifier.

23. The method according to claim 22, wherein step (c) comprises coupling said first polarity input of said operational amplifier to a prescribed voltage, and coupling said second polarity input of said operational amplifier via a said second voltage feedback path to the output of said operational amplifier.

24. The method according to claim 19, further including step (d) coupling said first polarity input of said operational amplifier to said prescribed voltage, and coupling said second polarity input of said operational amplifier to said output port.

25. The circuit arrangement according to claim 4, wherein said operational amplifier is operative, during said active mode of operation of said utility device, to bias said base of said bipolar transistor with a base voltage that tracks an emitter voltage of said emitter of said bipolar transistor.

26. The circuit arrangement according to claim 14, wherein said operational amplifier is operative, during said active mode of operation of said utility device, to bias said base of said bipolar transistor with a base voltage that tracks an emitter voltage of said emitter of said bipolar transistor.

27. The method according to claim 20, wherein said controlled circuit device comprises a bipolar transistor having a collector coupled to said second input port, an emitter coupled to said output port, and a base coupled to said control port, and wherein step (b) comprises biasing said base of said bipolar transistor with a base voltage that tracks an emitter voltage of said emitter of said bipolar transistor.

* * * * *